United States Patent
Murata

(10) Patent No.: US 6,285,935 B1
(45) Date of Patent: Sep. 4, 2001

(54) DEVICE FOR CONTROLLING SUSPENSION SHOCK ABSORBERS OF VEHICLES WITH SKEWED PHANTOM SUBSTITUTE

(75) Inventor: Masahiro Murata, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/613,821

(22) Filed: Jul. 11, 2000

(30) Foreign Application Priority Data

Aug. 5, 1999 (JP) ................................................. 11-222471

(51) Int. Cl.$^7$ ................................................. B60G 17/015
(52) U.S. Cl. ........................... 701/37; 701/38; 280/5.512; 280/5.515
(58) Field of Search ................................ 701/37, 38, 48, 701/72; 280/5.5, 5.506, 5.507, 5.515, 5.513, 5.51, 5.512

(56) References Cited

U.S. PATENT DOCUMENTS 5,584,498 * 12/1996 Danek ................................. 280/714
5,839,082 * 11/1998 Iwasaki .................................. 701/38

FOREIGN PATENT DOCUMENTS 7-125518    5/1995   (JP) .
9-309316    12/1997  (JP) .
11-268512   10/1999  (JP) .

* cited by examiner

Primary Examiner—Tan Nguyen
(74) Attorney, Agent, or Firm—Oliff & Berridge, PLC

(57) ABSTRACT

A device for controlling damping coefficients of shock absorbers (22FL, 22FR, 22RL, 22RR) of a four wheeled vehicle constructs a phantom damping system composed of a phantom side shock absorber (122) disposed vertically at a lateral inside of a turn running of the vehicle and longitudinally shifted from a center of gravity of the vehicle body in a direction of a longitudinal acceleration or deceleration of the vehicle to have a lower end movable along a ground surface together with the vehicle and an upper end vertically movable relative to the lower end with a first phantom damping coefficient (Cg) therebetween, and a phantom angular shock absorber (124) arranged to act between the upper end of the phantom side shock absorber and the vehicle body with a second phantom damping coefficient (Ca) therebetween, whereby, when the damping coefficients of the shock absorbers are controlled to substantially equalize the phantom damping system with the actual damping system of the actual shock absorbers with respect to damping vertical, rolling and pitching movements of the vehicle body, the mass center of the vehicle body is lowered according to a rolling during a turn running of the vehicle and/or a pitching of the vehicle body due to an acceleration or a deceleration of the vehicle, as the vehicle body rolls and/or pitches around the upper end of the phantom side shock absorber.

23 Claims, 11 Drawing Sheets

DEVICE FOR CONTROLLING SUSPENSION SHOCK ABSORBERS OF VEHICLES WITH SKEWED PHANTOM SUBSTITUTE

BACKGROUND OF THE INVENTION

1. Field of the Invention

The present invention relates to the art of vehicle suspension, and more particularly, to a device for controlling the damping coefficients of shock absorbers provided between a body of a four wheeled vehicle and the wheels thereof by constructing a phantom damping system substantially equivalent to the damping system provided by the actual shock absorbers.

2. Description of the Prior Art

In the art of the vehicle suspension, it is already known to variably control the damping coefficients of the shock absorbers incorporated therein so that a more desirable suspension performance is available.

For example, when the damping coefficient of a shock absorber disposed in parallel with a suspension spring supporting the vehicle body at a corresponding portion thereof on a wheel is variably controlled to be proportional to a ratio of the vertically stroking velocity of the corresponding body portion to the difference between the vertically stroking velocity of the corresponding body portion and the vertically stroking velocity of the wheel, the shock absorber can be imagined as acting between the vehicle body and a phantom stationary overhead construction, as generally called "sky hook damper.

If the shock absorber for the vehicle body could act against a stationary overhead construction, the stability performance of the vehicle body would of course be much improved, because the end of the shock absorber opposite to the vehicle body would no longer fluctuate as it actually does together with the wheel along the road surface in the actual construction.

On the other hand, when the four wheeled vehicles turn, the vehicles would become more stable against a rolling due to the turn if the center of gravity of the vehicle body is lowered. In view of this, in a co-pending earlier patent application No. (1243), a basic inventive concept of which is originated in the inventor of the present application, it has been proposed to control the damping coefficient of shock absorbers mounted in an ordinary arrangement between each wheel and a corresponding portion of the vehicle body of a four-wheeled vehicle by constructing a phantom damping system as a substitute for the actual shock absorbers, so that the vertical damping force against the vertical stroking and the angular damping moment against the rolling of the vehicle body are equivalently provided by a combination of a phantom side shock absorber located laterally inside of a turn of the vehicle as arranged to act vertically and a phantom angular shock absorber arranged to act between an upper end of the phantom side shock absorber and the vehicle body. By the damping coefficients of the actual shock absorbers being so equivalently controlled by way of the phantom damping system, when the vehicle body rolls, it rolls around a pivot point between the upper end of the phantom side shock absorber and the corresponding lateral end of the phantom angular shock absorber, so that the center of gravity of the vehicle body is lowered according to a rolling thereof due to a turn running of the vehicle.

SUMMARY OF THE INVENTION

It is contemplated that if the center of gravity of the vehicle body is lowered when the vehicle body pitches longitudinally so as to incline rearward or forward due to an acceleration or a braking of the vehicle, the running stability of the vehicle will be further improved.

In view of the above, it is a primary object of the present invention to provide a device for controlling damping coefficients of shock absorbers of a four-wheeled vehicle such that the center of gravity of the vehicle body is lowered according to a rolling of the vehicle body due to a turn running of the vehicle and also according to a pitching of the vehicle body due to an acceleration or a deceleration of the vehicle.

According to the present invention, such a primary object of the present invention is accomplished by a device for controlling damping coefficients of shock absorbers of a four-wheeled vehicle having a vehicle body, front left, front right, rear left and rear right wheels each supporting the vehicle body at a corresponding portion thereof, and the shock absorbers each acting between each of the wheels and the corresponding portion of the vehicle body, comprising:

means for constructing a phantom damping system composed of a phantom side shock absorber disposed vertically at a skewed position laterally inside of a turn running of the vehicle and longitudinally shifted from a center of gravity of the vehicle body in a direction of an acceleration or a deceleration of the vehicle to have a lower end movable along a ground surface together with the vehicle and an upper end vertically movable relative to the lower end with a first phantom damping coefficient therebetween, and a phantom angular shock absorber arranged to act between the upper end of the phantom side shock absorber and the vehicle body with a second phantom damping coefficient therebetween, such that the phantom damping system provides the vehicle body with a substantially same phantom vertical damping force against a vertical movement of the vehicle body, a substantially same phantom angular damping moment against a rolling angular movement of the vehicle body during a rolling of the vehicle body due to the turn running, and a substantially same phantom angular damping moment against a pitching angular movement of the vehicle body during a pitching of the vehicle body due to the acceleration or the deceleration of the vehicle, respectively, as the shock absorbers acting between the wheels and the corresponding portions of the vehicle;

means for calculating values of at least the first and second phantom damping coefficients for obtaining an optimum rolling and/or pitching performance of the vehicle body by the phantom damping system during the turn and/or acceleration or deceleration running of the vehicle; and means for controlling the damping coefficients of the shock absorbers acting between the wheels and the corresponding portions of the vehicle body based upon the calculated values of the first and second phantom damping coefficients.

When the phantom damping system is so constructed as described above, the vehicle body will be provided with a substantially same damping effect by the phantom side and angular shock absorbers as that provided by the shock absorbers acting between the wheels and the corresponding portions of the vehicle body against a vertical movement, a rolling movement due to a turn running as well as a pitching movement due to an acceleration or deceleration of the vehicle.

In the rolling or pitching of the vehicle body damped by the ordinary shock absorbers acting between the wheels and the corresponding portions of the vehicle body, the vehicle body will roll around a roll center or pitch around a pitch center generally vertically aligned with the mass center of the vehicle body and substantially maintained at a constant height, because the vertical forces generated in the left side and the right side or the vertical forces generated in the front side and the rear side of the ordinary suspension system by a rolling or a pitching of the vehicle body will generally balance in the vertical direction.

However, the vehicle body damped by the above-mentioned phantom damping system rolls and/or pitches around the pivot point of the phantom angular shock absorber connected with the upper end of the phantom side shock absorber positioned laterally inside of a turn running of the vehicle and longitudinally shifted from the mass center of the vehicle body in a direction of a longitudinal acceleration or deceleration. Therefore, the center of gravity or the mass center of the vehicle body damped by the above-mentioned phantom damping system lowers according to a rolling or a pitching thereof due to the turn running or the acceleration or the deceleration of the vehicle.

The principle of the damping coefficient control according to the present invention will be described with reference to FIGS. 1–5.

Referring to FIGS. 1–3 showing a standard skeleton model of the suspension system of a four-wheeled vehicle in plan, left side and back views, respectively, a vehicle body 110 is supported by front left, front right, rear left and rear right wheels 116FL, 116FR, 116RL and 116RR via corresponding parallel arrangements of shock absorbers 126FL, 126FR, 126RL and 126RR and springs 118FL, 118FR, 118RL and 118RR, respectively. The four wheels are arranged with the wheel base of a distance H and the wheel tread of a distance W as indicated in FIGS. 1–3. The shock absorbers 126FL, 126FR, 126RL and 126RR are each of a variable type whose damping coefficient is variably controllable.

In such a suspension system, vertical shiftings of portions of the vehicle body vertically above the front left, front right, rear left and rear right wheels 116 FL, 116FR, 116RL and 116RR will be denoted by Xfl, Xfr, Xrl and Xrr, respectively, to be positive toward downward. Then, Xfl and Xrl will be rewritten as Xfin and Xrin, and Xfr and Xrr will be rewritten as Xfout and Xrout, respectively, when the vehicle is making a left turn, while Xfr and Xrr will be rewritten as Xfin and Xrin, and Xfl and Xrl will be rewritten as Xfout and Xrout, respectively, when the vehicle is making a right turn. Further, Xfin and Xfout will be rewritten as Xain and Xbout, and Xrin and Xrout will be rewritten as Xbin and Xbout, respectively, when the vehicle is accelerated, while Xrin and Xrout will be rewritten as Xain and Xaout, and Xfin and Xfout will be rewritten as Xbin and Xbout, respectively, when the vehicle is decelerated.

Then, a vertical shifting of the vehicle body at its center of gravity indicated by 112 is, when denoted as Xh, expressed as follows:

$$Xh = \left(\frac{Xain + Xbin + Xaout + Xbout}{4}\right) \quad (1)$$

Further, denoting an angle of rolling of the vehicle body around the longitudinal axis x as Ψr, to be positive in the counter-clockwise direction as viewed from the back of the vehicle, and an angle of pitching of the vehicle body around the lateral axis y as Ψp, to be positive in the counter-clockwise direction as viewed from the left side of the vehicle, respectively, damping coefficients of the shock absorbers 126FL–126RR serving at the leading and trailing sides of the longitudinal acceleration (inclusive of both traction and braking of the vehicle) at the inside and outside of a turn of the vehicle as Cain, Cbin, Caout and Cbout, respectively, and the mass, the inertial moment around the longitudinal axis x and the inertial moment around the lateral axis y as M, Ir and Ip, respectively, the vertical, rolling and pitching movements of the vehicle body are expressed as follows:

$$-M\ddot{X}h = Cain\,\dot{X}ain + Caout\,\dot{X}aout + Cbin\,\dot{X}bin + Cbout\,\dot{X}bout + [\text{vertical force applied by the springs}] \quad (2)$$

$$-Ir\ddot{\Psi}r = (Cain\dot{X}ain + Cbin\dot{X}bin)\frac{W}{2} - (Caout\dot{X}aout + Cbout\dot{X}bout)\frac{W}{2} + \quad (3)$$
[roll moment applied by the springs]

$$-Ip\ddot{\Psi}p = (Cain\dot{X}ain + Caout\dot{X}aout)\frac{H}{2} - (Cbin\dot{X}bin + Cbout\dot{X}bout)\frac{H}{2} + \quad (4)$$
[pitch moment applied by the springs]

On the other hand, referring to FIGS. 1, 4 and 5 showing a skeleton model of a phantom suspension in left side and back views, respectively, which is adapted to be substituted for the suspension system shown in FIGS. 1–3 according to the present invention, the shock absorbers 126FL, 126FR, 126RL and 126RR are replaced by a combination of a phantom side shock absorber 122 and a phantom angular shock absorber 124. Assuming that in FIGS. 1, 4 and 5, the vehicle is making a left turn under a forward acceleration, i.e. traction, the phantom side shock absorber 122 is arranged vertically at a position located laterally inside of the turn running and longitudinally shifted from the center of gravity of the vehicle body in a direction of the longitudinal acceleration, so as to expand a skew distance L relative to the center of gravity of the vehicle body 112, with a skew angle δ with respect to the lateral axis y of the vehicle, having a lower end imagined to move along a ground surface with a phantom wheel 120, while the phantom angular shock absorber 124 is arranged to dampen both rolling and pitching movements of the vehicle body 110 by generating an angular moment around a phantom pivot point 114 relative to an upper half portion of the phantom side shock absorber 122.

According to the suspension incorporating such a phantom damping system, denoting the linear and angular damping coefficients of the phantom side and angular shock absorbers 122 and 124 as Cg and Ca, respectively, the vertical, rolling and pitching movements of the vehicle body are expressed as follows:

$$-M\ddot{X}h = Cg\,\dot{X}s + [\text{vertical force applied by the springs}] \quad (5)$$

$$-Ir\ddot{\Psi}r = Ca\dot{X}sL\cos\delta + Ca\frac{W}{2}\left(\frac{\dot{X}ain + \dot{X}bin}{2} - \frac{\dot{X}aout + \dot{X}bout}{2}\right) + \quad (6)$$
[roll moment applied by the springs]

-continued $$-Ip\dot{\Psi}p = Ca\dot{X}sL \sin \delta + \quad (7)$$
$$Ca\frac{H}{2}\left(\frac{\dot{X}ain + \dot{X}aout}{2} - \frac{\dot{X}bin + \dot{X}bout}{2}\right) +$$
[pitch moment applied by the springs]

wherein $$\dot{X}s = \dot{X}h + \left(\frac{\dot{X}ain + \dot{X}bin - \dot{X}aout - \dot{X}bout}{2W}\right)L \cos \delta + \quad (8)$$
$$\left(\frac{\dot{X}ain + \dot{X}aout - \dot{X}bin - \dot{X}bout}{2H}\right)L \sin \delta$$

Therefore, for substituting the phantom damping system of FIGS. 4 and 5 for the actual damping system of FIGS. 2 and 3, the following conditions will have to be established:

$$Cain\dot{X}ain + Caout\dot{X}aout + Cbin\dot{X}bin + Cbout\dot{X}bout = Cg\dot{X}s \quad (9)$$

$$(Cain\dot{X}ain + Cbin\dot{X}bin)\frac{W}{2} - (Caout\dot{X}aout + Cbout\dot{X}bout)\frac{W}{2} = \quad (10)$$
$$Ca\dot{X}sL \cos \delta + Ca\frac{W}{2}\left(\frac{\dot{X}fin + \dot{X}rin}{2} - \frac{\dot{X}fout + \dot{X}rout}{2}\right)$$

$$(Cain\dot{X}ain + Caout\dot{X}aout)\frac{H}{2} - (Cbin\dot{X}bin + Cbout\dot{X}bout)\frac{H}{2} = \quad (11)$$
$$Ca\dot{X}sL \sin \delta + Ca\frac{H}{2}\left(\frac{\dot{X}ain + \dot{X}aout}{2} - \frac{\dot{X}bin + \dot{X}bout}{2}\right)$$

Further, herein it is assumed that the vehicle body is rigid against a twisting around the longitudinal axis x as well as the lateral axis y. In this case, the following condition is available:

$$Cain\dot{X}ain - Caout\dot{X}aout - Cbin\dot{X}bin + Cbout\dot{X}bout = 0 \quad (12)$$

According to the conditions of equations 9, 10, 11 and 12, the damping coefficients Cain, Caout, Cbin and Cbout are expressed as follows:

$$Cain = \frac{1}{4\dot{X}ain}(Fc + F\alpha + F\beta) \quad (13)$$

$$Caout = \frac{1}{4\dot{X}aout}(Fc + F\alpha - F\beta) \quad (14)$$

$$Cbin = \frac{1}{4\dot{X}bin}(Fc - F\alpha + F\beta) \quad (15)$$

$$Cbout = \frac{1}{4\dot{X}bout}(Fc - F\alpha - F\beta) \quad (16)$$

wherein $$Fc = Cg\left\{(\dot{X}ain - \dot{X}aout + \dot{X}bin - \dot{X}bout)\frac{L}{W}\cos\delta + \quad (17)\right.$$
$$(\dot{X}ain + \dot{X}aout - \dot{X}bin - \dot{X}bout)\frac{L}{W}\sin\delta +$$
$$\left.\frac{1}{2}(\dot{X}ain + \dot{X}aout + \dot{X}bin + \dot{X}bout)\right\}$$

$$F\alpha = \frac{2}{H}FcL \sin \delta + \frac{Ca}{2}(\dot{X}ain + \dot{X}aout - \dot{X}bin - \dot{X}bout) \quad (18)$$

$$F\beta = \frac{2}{W}FcL \cos \delta + \frac{Ca}{2}(\dot{X}ain - \dot{X}aout + \dot{X}bin - \dot{X}bout) \quad (19)$$

Therefore, by substituting a phantom damping system such as shown in FIGS. 1, 4 and 5 for the damping system shown in FIGS. 1, 2 and 3, while variably controlling Cain, Caout, Cbin and Cbout as calculated in equations 13, 14, 15 and 16, respectively, the vehicle body will exhibit such vertical, rolling and pitching movements as substantially equal to those available by the suspension system incorporating the actual shock absorbers 126FL–126RR, while providing the advantage that, when the vehicle body rolls due to a turn running and/or pitches due to an acceleration or a deceleration of the vehicle, the center of gravity 112 of the vehicle body is lowered according to the rolling and/or the pitching thereof, because the vehicle body rolls and/or pitches around the phantom pivot point 114.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 6:
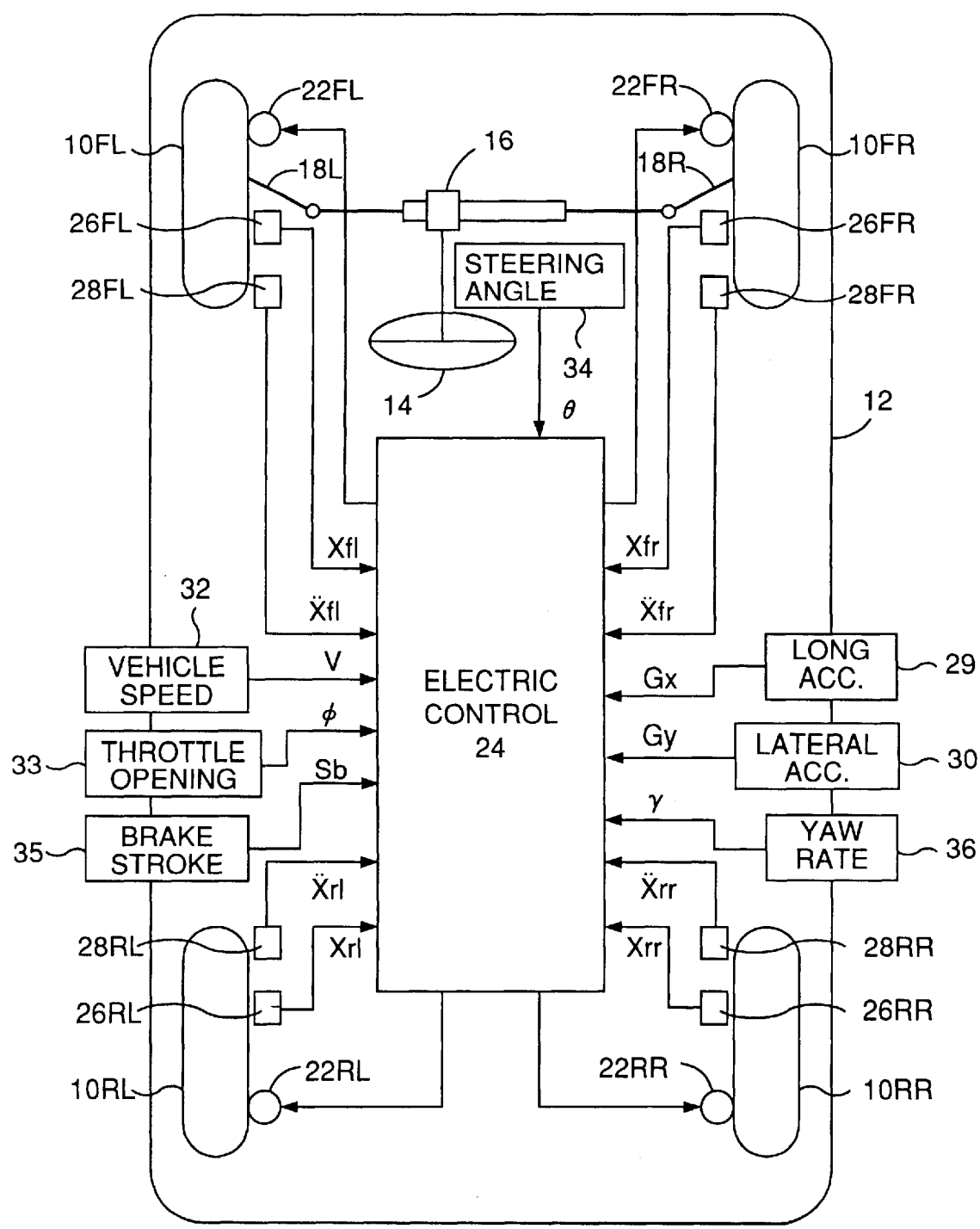
FIG. 6 is a diagrammatic plan view showing a four wheeled vehicle in which the damping coefficient control device accrding to the present invention is incorporated in the form of several embodiments.

Referring to FIG. 6, the vehicle herein shown has front left, front right, rear left and rear right wheels 10FL, 10FR, 10RL and 10RR suspended from a vehicle body 12. The front left and front right wheels 10FL and 10Fr are steered by a steering system including a steering wheel 14, a rack-and-pinion assembly 16, and left and right connecting rods 18L and 18R. The rear wheels 10RL and 10RR are driven by a drive system not shown in the figure, while the wheels 10FL, 10FR, 10RL and 10RR are separately braked by their wheel cylinders not shown in the figure being supplied with a hydraulic pressure from a hydraulic circuit according to a depression of a brake pedal by a driver, though not shown in FIG. 6, or under a control of electric control means 24. The vehicle body 12 is supported on the wheels 10FL, 10FR, 10RL and 10RR at portions thereof corresponding to these wheels via respective corresponding parallel combinations of suspension springs not shown in the figure and shock absorbers 22FL, 22FR, 22RL and 22RR, as diagrammatically shown in FIGS. 2 and 3.

The electric control means 24 includes a microcomputer for conducting control calculations described in detail hereinbelow based upon signals supplied thereto from wheel stroke sensors 26FL, 26FR, 26RL and 26RR indicating up and down strokes Xfl, Xfr, Xrl and Xrr of the front left, front right, rear left and rear right wheels, respectively, relative to the vehicle body, signals from vertical acceleration sensors 28FL, 28FR, 28RL and 28RR indicating vertical accelerations $\ddot{X}fl$, $\ddot{X}fr$, $\ddot{X}rl$ and $\ddot{X}rr$ of body portions vertically above the front left, front right, rear left and rear right wheels, respectively, a signal from a longitudinal acceleration sensor 29 indicating longitudinal acceleration Gx of the vehicle body, a signal from a lateral acceleration sensor 30 indicating lateral acceleration Gy of the vehicle body, a signal from a vehicle speed sensor 32 indicating vehicle speed V, a signal from a throttle opening sensor 33 indicating opening φ of a throttle valve (not shown), a signal from a steering angle sensor 34 indicating steering angle θ, a signal from a brake stroke sensor 35 indicating brake stroke Sb of a brake pedal (not shown), a signal from a yaw rate sensor 36 indicating yaw rate γ of the vehicle, etc.

Figure 1:
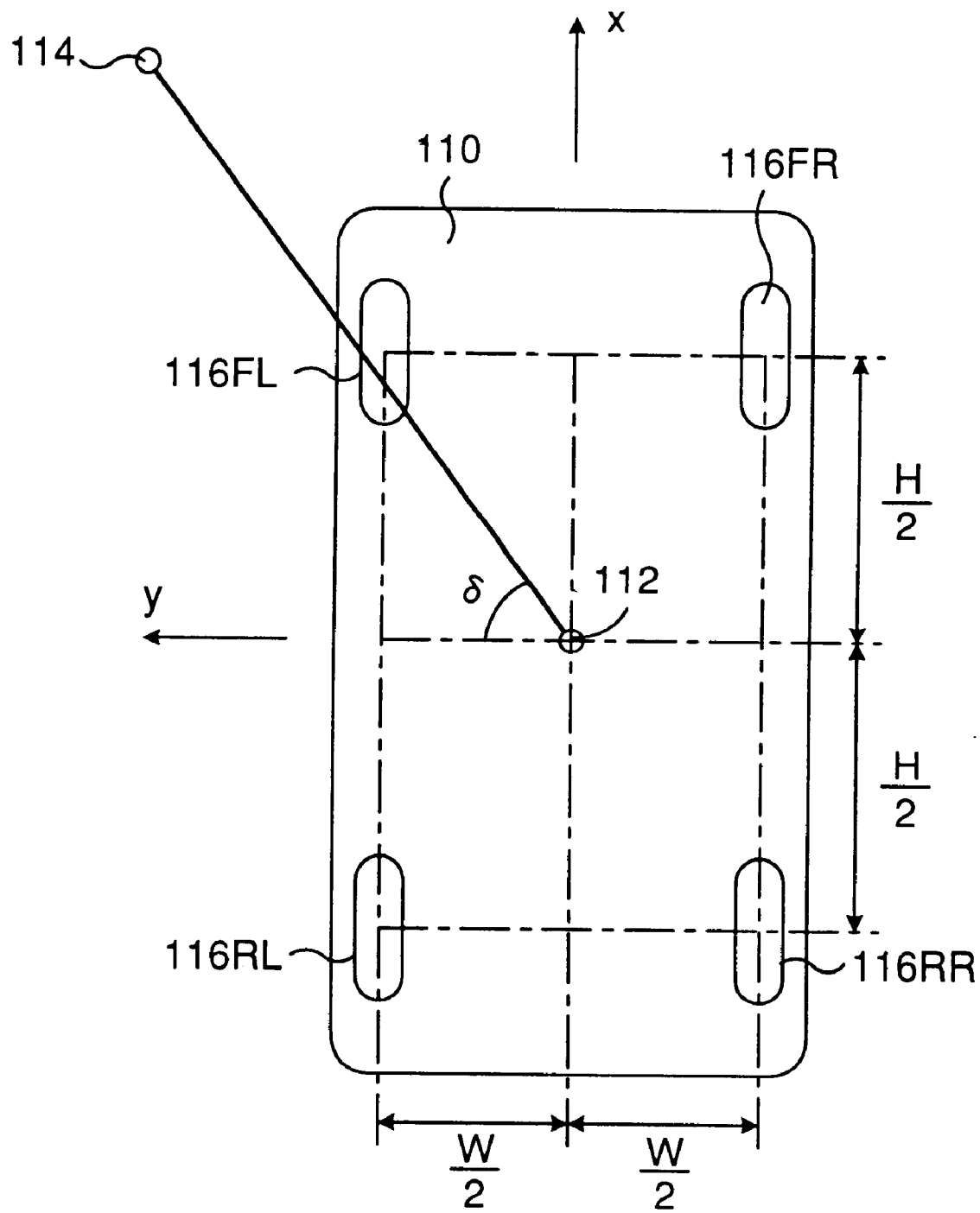
FIG. 1 is a diagrammatic plan view of a four-wheeled vehicle.
Figure 2:
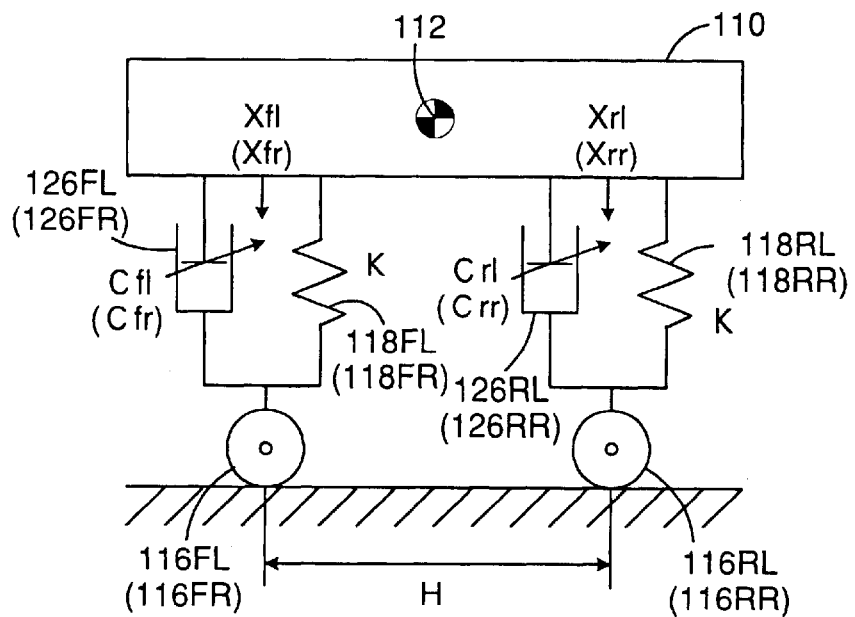
FIG. 2 is a standard skeleton model of the suspension system of a four wheeled vehicle viewed from a left side thereof.
Figure 3:
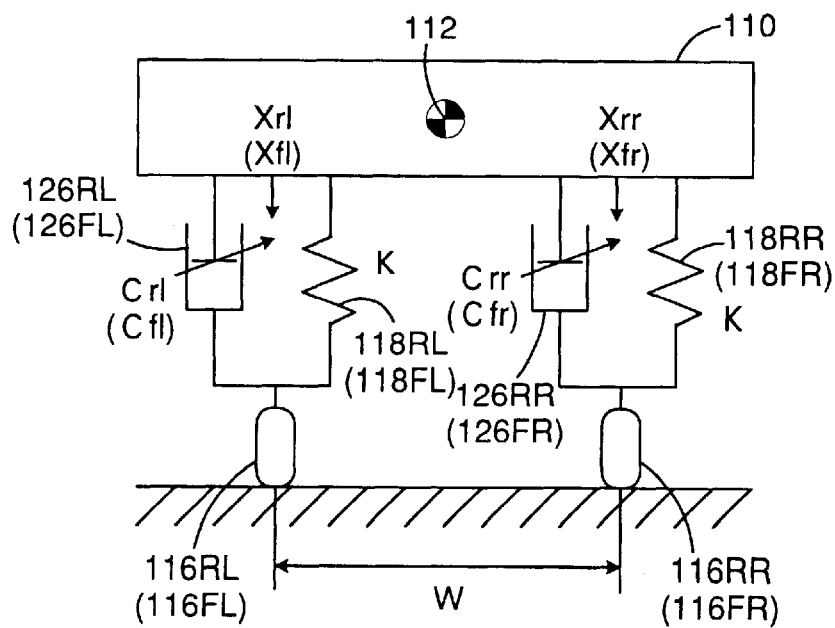
FIG. 3 is a sleleton model showing the vehicle suspension system shown in FIG. 2 as viewed from the back threof.
Figure 4:
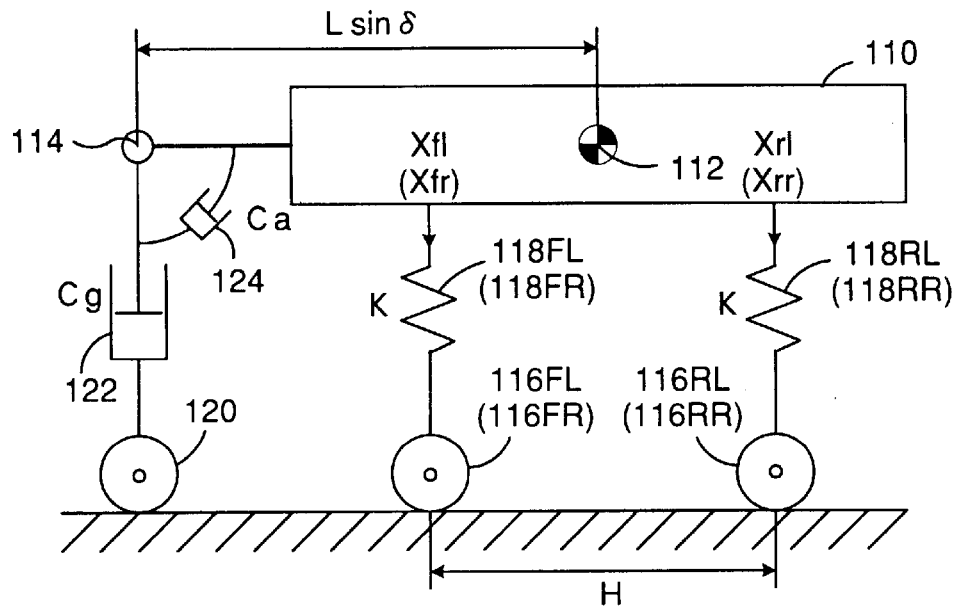
FIG. 4 is a skeleton model similar to FIG. 3, showing a suspension system in which the damping coefficient control device according to the present invention is incorporated.
Figure 5:
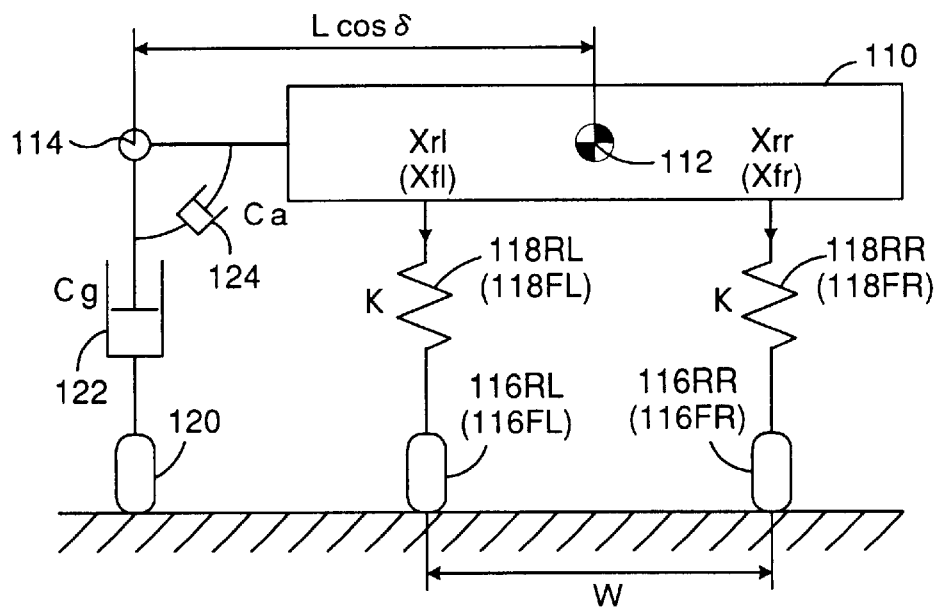
FIG. 5 is a skeleton model showing the vehicle suspension system shown in FIG. 4 as viewed from the back threof.

The damping control device according to the present invention is essentially incorporated in the electric control means 24, so as to receive such motion parameters of the vehicle as described above, to conduct certain control calculations as described hereinbelow, and to vary the damping coefficients of the shock absorbers 22FL–22RR so that the suspension system of the vehicle having a construction such as shown in FIGS. 2 and 3 operates like a suspension system such as shown in FIGS. 4 and 5.

In the following, the basic construction of the damping control device according to the present invention will be described in the form of its operation with reference to FIG. 7.

Figure 7:
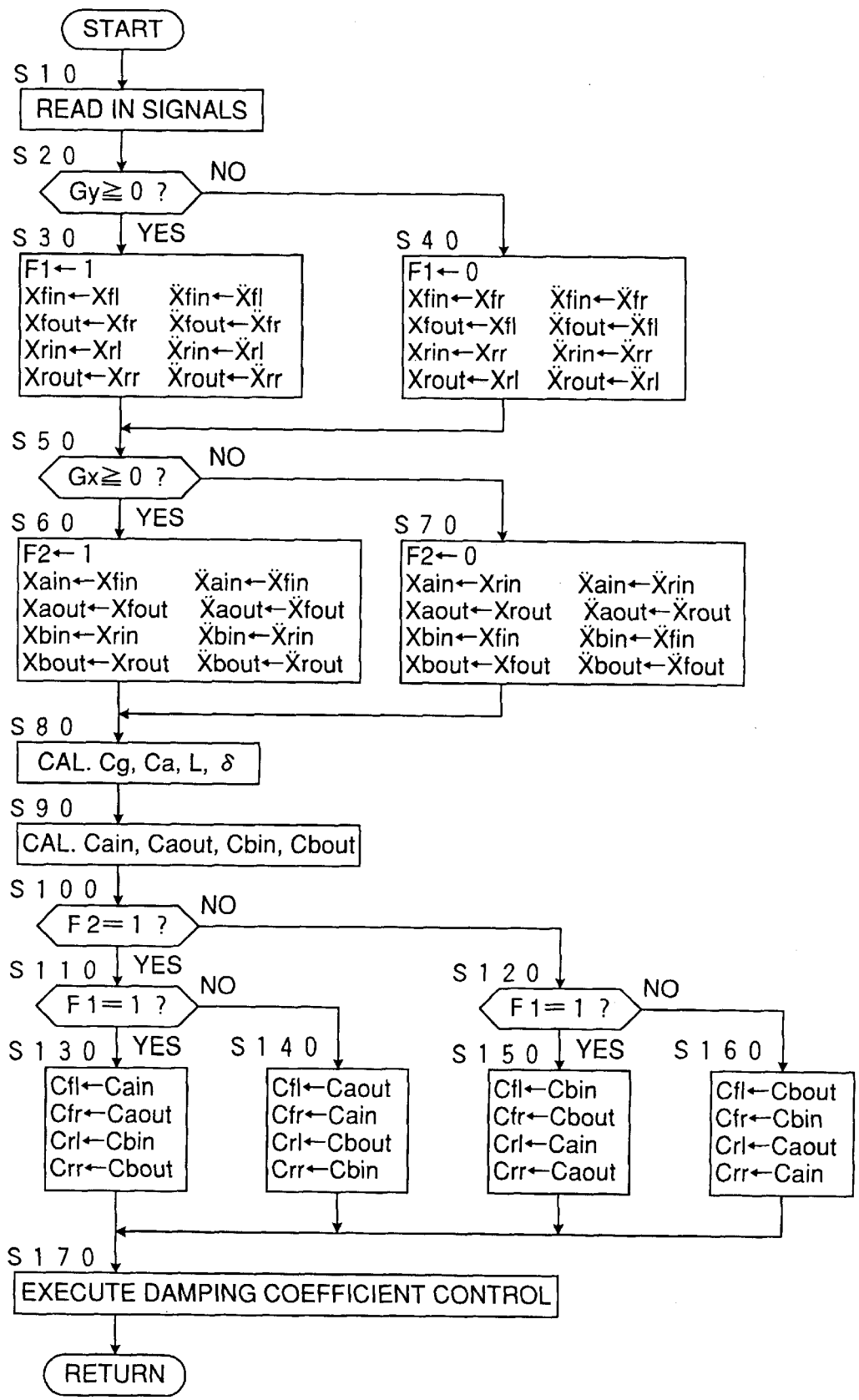
FIG. 7 is a flowchart showing the outline of the operation of the damping coefficient control device accrding to the present invention.

Referring to FIG. 7, when the damping control device according to the present invention is started for operation, in step 10, signals are read in from those sensors described above.

In step 20, it is judged if the lateral acceleration Gy detected by the lateral acceleration sensor 30 is zero or positive, i.e. if the lateral acceleration is zero or acting leftward of the vehicle. The lateral acceleration acting at the vehicle body in the leftward direction (due to a leftwardly directed centripetal force acting in a left turn of the vehicle) is made positive. When the answer is yes, the control proceeds to step 30, while when the answer is no, the control proceeds to step 40.

In step 30, by setting a flag F1 to 1, Xfl, Xfr, Xrl and Xrr detected by the wheel stroke sensors 26FL, 26FR, 26RL and 26RR are substituted for Xfin, Xfout, Xrin and Xrout, respectively, and $\ddot{X}fl$, $\ddot{X}fr$, $\ddot{X}rl$ and $\ddot{X}rr$ detected by the vertical acceleration sensors 28FL, 28FR, 28RL and 28RR are substituted for $\ddot{X}fin$, $\ddot{X}fout$, $\ddot{X}rin$ and $\ddot{X}rout$, respectively.

In step 40, by setting the flag F1 to 0, Xfr, Xfl, Xrr and Xrl are substituted for Xfin, Xfout, Xrin and Xrout, respectively, and $\ddot{X}fr$, $\ddot{X}fl$, $\ddot{X}rr$ and $\ddot{X}rl$ are substituted for $\ddot{X}fin$, $\ddot{X}fout$, $\ddot{X}rin$ and $\ddot{X}rout$, respectively.

Thus, the parameters Xfr, Xfl, Xrr and Xrl and $\ddot{X}fr$, $\ddot{X}fl$, $\ddot{X}rr$ and $\ddot{X}rl$ are alternatively set up for a left turn (with a straight running being included in this side only for convenience) and a right turn for the phantom shock absorber control.

In step 50, it is judged if the longitudinal acceleration Gx detected by the longitudinal acceleration sensor 29 is zero or positive, i.e. if the longitudinal acceleration is zero or acting forward of the vehicle by a traction. When the answer is yes, the control proceeds to step 60, while when the answer is no, the control proceeds to step 70.

In step 60, by setting a flag F2 to 1, Xfin, Xfout, Xrin and Xrout set up in step 30 or 40 are substituted for Xain, Xaout, Xbin and Xbout, respectively, and $\ddot{X}fin$, $\ddot{X}fout$, $\ddot{X}rin$ and $\ddot{X}rout$ set up in step 30 or 40 are substituted for $\ddot{X}ain$, $\ddot{X}aout$, $\ddot{X}bin$ and $\ddot{X}bout$, respectively.

In step 70, by setting the flag F2 to 0, Xrin, Xrout, Xfin and Xfout set up in step 30 or 40 are substituted for Xain, Xaout, Xbin and Xbout, respectively, and $\ddot{X}rin$, $\ddot{X}rout$, $\ddot{X}fin$ and $\ddot{X}fout$ are substituted for $\ddot{X}ain$, $\ddot{X}aout$, $\ddot{X}bin$ and $\ddot{X}bout$, respectively.

Thus, the parameters Xfr, Xfl, Xrr and Xrl and $\ddot{X}fr$, $\ddot{X}fl$, $\ddot{X}rr$ and $\ddot{X}rl$ are alternatively set up for a forward acceleration, i.e. traction (with neither traction nor braking being included in this side only for convenience) and a rearward acceleration or forward deceleration, i.e. braking, for the phantom shock absorber control.

In step 80, the damping coefficient Cg of the phantom side shock absorber 122, the damping coefficient Ca of the phantom angular shock absorber 124, the skew distance L of the phantom side shock absorber 122 and the skew angle δ of the phantom side shock absorber 122 relative to the lateral axis y are calculated as described in detail hereinbelow.

In step 90, the damping coefficients Cain, Caout, Cbin and Cbout for the shock absorbers of the wheels serving at the downstream side of the longitudinal acceleration as viewed in the direction of the longitudinal acceleration and the inside of the turn, the downstream side of the longitudinal acceleration as viewed in the direction of the longitudinal acceleration and the outside of the turn, the upstream side of the longitudinal acceleration as viewed in the direction of the longitudinal acceleration and the inside of the turn, and the upstream side of the longitudinal acceleration as viewed in the direction of the longitudinal acceleration and the outside of the turn, respectively, are calculated based upon the Cg, Ca, L and δ calculated in step 80.

In step 100, it is judged if the flag F2 is 1. When the answer is yes, the control proceeds to step 110, while when the answer is no, the control proceeds to step 120.

In step 110, it is judged if the flag F1 is 1. When the answer is yes, the control proceeds to step 130, while when the answer is no, the control proceeds to step 140.

In step 120, it is judged if the flag F1 is 1. When the answer is yes, the control proceeds to step 150, while when the answer is no, the control proceeds to step 160.

In step 130, Cain, Caout, Cbin and Cbout are put in for the damping coefficients Cfl, Cfr, Crl and Crr of the front left, front right, rear left and rear right shock absorbers 22FL, 22FR, 22RL and 22RR, while in step 140, Caout, Cain, Cbout and Cbin are put in for the damping coefficients Cfl, Cfr, Crl and Crr of the front left, front right, rear left and rear right shock absorbers 22FL, 22FR, 22RL and 22RR.

In step 150, Cbin, Cbout, Cain and Caout are put in for the damping coefficients Cfl, Cfr, Crl and Crr of the front left, front right, rear left and rear right shock absorbers 22FL, 22FR, 22RL and 22RR, while in step 160, Cbout, Cbin, Caout and Cain are put in for the damping coefficients Cfl, Cfr, Crl and Crr of the front left, front right, rear left and rear right shock absorbers 22FL, 22FR, 22RL and 22RR.

In step 170, the damping coefficients of the shock absorbers are controlled according to the values of the Cfl-Crr.

Thus, the damping coefficients of the shock absorbers 22FL-22RR are controlled through a substitution by the phantom damping system shown in FIGS. 4 and 5 under any turn running and/or forwardly or rearwardly accelerated (i.e. traction or braking) conditions, with the phantom side shock absorber 122 being always positioned laterally inside of the turn as well as longitudinally downstream side of the longitudinal acceleration as viewed in the direction of the longitudinal acceleration.

In the following, the calculations of Cg, Ca, L and $\delta$ conducted in step 80 will be described in more detail with respect to several embodiments.

Basically, the damping coefficient Cg of the phantom side shock absorber 112 is substantially dependent upon the vertical stroking acceleration of the vehicle body relative to the ground surface, provided that the wheels are kept in contact with the ground surface. On the other hand, the damping coefficient Ca of the phantom angular shock absorber 124 is substantially dependent upon the pitching and rolling accelerations of the vehicle body, respectively.

The vertical acceleration of the mass center 112 of the vehicle body, and the pitching and rolling accelerations of the vehicle body, when denoted as Gh, Gp and Gr, respectively, may be obtained as follows:

$$Gh = (\ddot{X}ain + \ddot{X}aout + \ddot{X}bin + \ddot{X}bout)/4$$

$$Gp = (\ddot{X}bin + \ddot{X}bout - \ddot{X}ain - \ddot{X}aout)/H$$

$$Gr = (\ddot{X}aout + \ddot{X}bout - \ddot{X}ain - \ddot{X}bin)/W$$

Then, looking at maps such as shown in FIGS. 8A, 8B, 8C and 8D based upon the absolute values of Gh, Gp and Gr, basic values of Cg, Ca, Lx and Ly are obtained. The general performances of Cg, Ca, Lx and Ly relative to |Gh|, |Gp|+|Gr|, |Gp| and |Gr| will be apparent from the maps. However, it will be appreciated that the maps of FIGS. 8A, 8B, 8C and 8D are designed as an embodiment of providing a phantom damping system such as shown in FIGS. 4 and 5 with a certain desirable operation performance. The present invention is not limited to such a particular performance.

Based upon the values of Lx and Ly, the basic values of L and $\delta$ are are obtained as follows:

$$L = (Lx^2 + Ly^2)^{1/2}$$

$$\delta = \tan^{-1}(Lx/Ly)$$

Figure 9A:
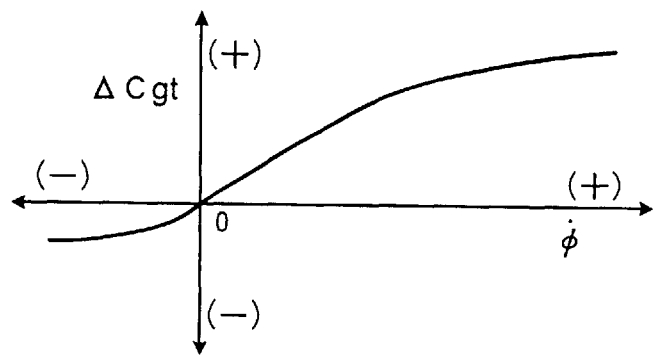
FIGS. 9A, 9B and 9C are maps for obtaining modification amounts $\Delta$Cgt, $\Delta$Cat and $\Delta$Lxt for Cg, Ca and Lx based upon throttle opening rate $\dot{\phi}$.
Figure 9B:
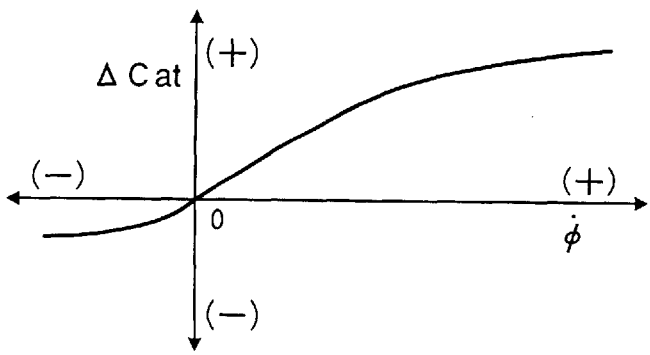
Figure 9C:
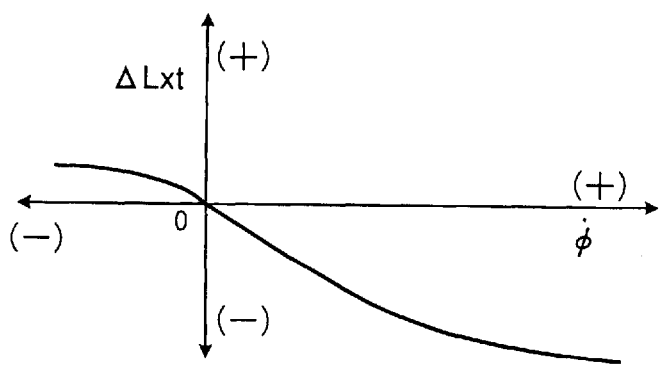

The damping coefficients Cg and Ca, the distance L and the skew angle $\delta$ may be modified according to a rate (i.e. speed) of opening or closing the throttle valve (not shown) of the vehicle according to such performances as shown in FIGS. 9A, 9B and 9C, respectively. The rate of opening or closing of the throttle valve will be available by differentiating the throttle opening $\phi$ detected by the throttle opening sensor 33. The general performances of $\Delta$Cgt, $\Delta$Cat, $\Delta$Lt and $\Delta\delta$t ($\Delta$Lt and $\Delta\delta$t are calculated based upon $\Delta$Lxt.) relative to $\phi$ will be apparent from the maps.

The modifications by $\Delta$Cgt, $\Delta$Cat, $\Delta$Lt and $\Delta\delta$t are such that Cg, Ca, L and $\delta$ basically obtained from the maps of FIGS. 8A, 8B, 8C and 8D are respectively increased by $\Delta$Cgt, $\Delta$Cat, $\Delta$Lt and $\Delta\delta$t.

Figure 10A:
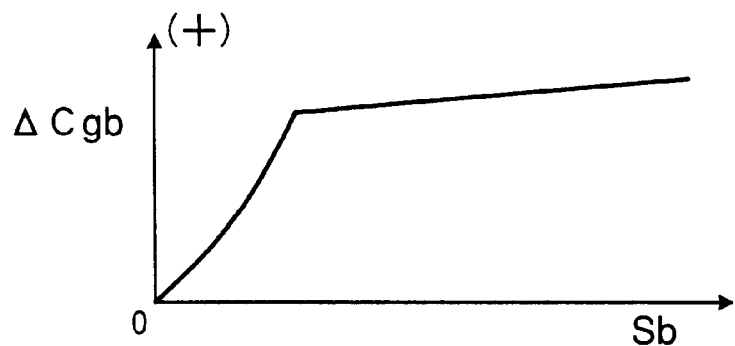
FIGS. 10A, 10B and 10C are maps for obtaining modification amounts $\Delta$Cgb, $\Delta$Cab and $\Delta$Lxb for Cg, Ca and Lx based upon brake stroke Sb.
Figure 10B:
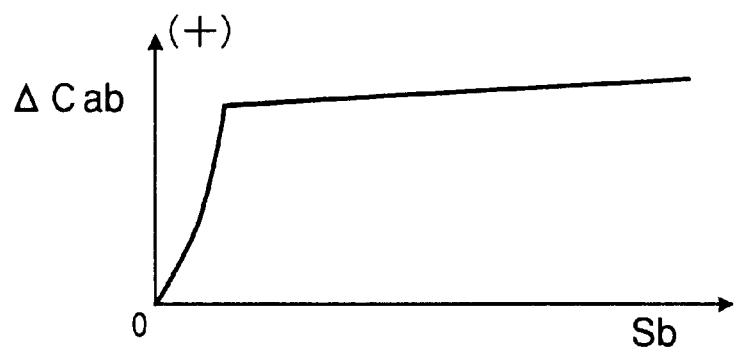
Figure 10C:
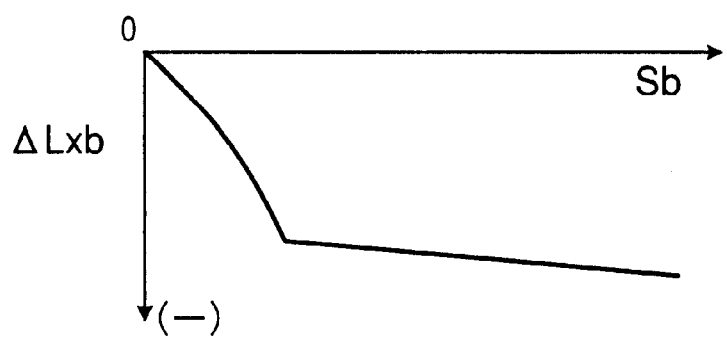

The damping coefficients Cg and Ca, the distance L and the skew angle $\delta$ may further be modified according to a braking in a manner such as shown by maps of FIGS. 10A, 10B and 10C, respectively. The modifications by $\Delta$Cgb, $\Delta$Cab, $\Delta$Lb and $\Delta\delta$b may also be made such that these modification amounts are added to Cg, Ca, L and $\delta$ basically obtained from the maps of FIGS. 8A, 8B and 8C. ($\Delta$Lb and $\Delta\delta$b are calculated based upon $\Delta$Lxb.) The general performances of $\Delta$Cgb, $\Delta$Cab, $\Delta$Lb and $\Delta\delta$b relative to Sb will be apparent from the maps.

Figure 11A:
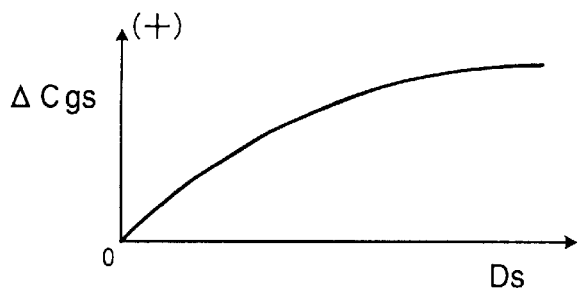
FIGS. 11A and 11B are maps for obtaining modification amounts $\Delta$Cgs and $\Delta$Cas for Cgf and Ca based upon a swaying index Ds.
Figure 11B:
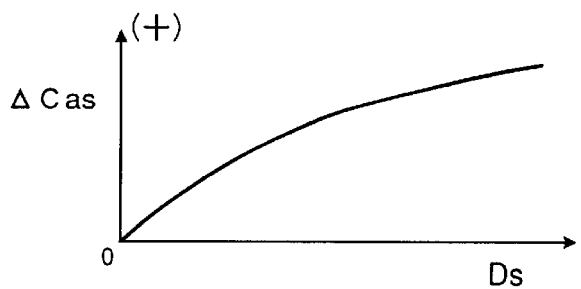

The damping coefficients Cg and Ca may further be modified against a swaying of the vehicle body. For such a modification, first the vertical accelerations $\ddot{X}j$ (j=ain, aout, bin and bout) are each processed by a band pass filter for passing those of consonant frequencies of the vertical stroking vibration of the vehicle body above the suspension springs, so as to obtain a swaying index Ds. Then, modification amounts $\Delta$Cgs and $\Delta$Cas for additively modifying Cg and Ca are obtained against the magnitude of Ds according to such maps as shown in FIGS. 11A and 11B, respectively. By the damping coefficients Cg and Ca being increased by the modification amounts $\Delta$Cgs and $\Delta$Cas, respectively, according to the magnitude of Ds, a consonant swaying of the vehicle body is effectively suppressed. The general performances of $\Delta$Cgs and $\Delta$Cas relative to Ds will be apparent from the maps. However, it will be desirable that the modifications by $\Delta$Cgs and $\Delta$Cas are not directly made but are made in a harmony with a rattling of the vehicle body and a flapping of the wheels described hereinbelow.

Figure 12A:
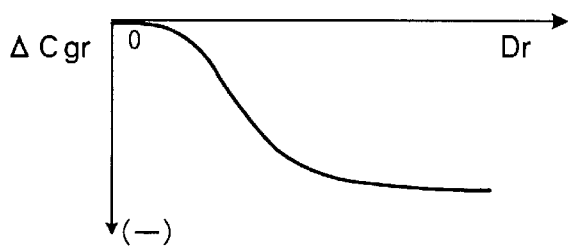
FIGS. 12A and 12B are maps for obtaining modification amounts $\Delta$Cgr and $\Delta$Car for Cg and Ca based upon a rattling index Dr.
Figure 12B:
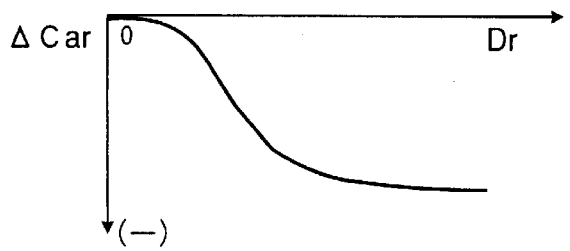

The damping coefficients Cg and Ca may further be modified against a rattling of the vehicle body. For such a modification, the vertical accelerations $\ddot{X}j$ (j=ain, aout, bin and bout) are processed by a band pass filter for passing those of rattling frequencies of the vehicle body to obtain a rattling index Dr of the vehicle body. Then, negative modification amounts $\Delta$Cgr and $\Delta$Car for Cg and Ca are obtained against the magnitude of Dr according to maps such as shown in FIGS. 12A and 12B, respectively, so that the phantom side and angular shock absorbers are softened according to an increase of the rattling index Dr. The general performances of $\Delta$Cgr and $\Delta$Car relative to Dr will be apparent from the maps.

Figure 13A:
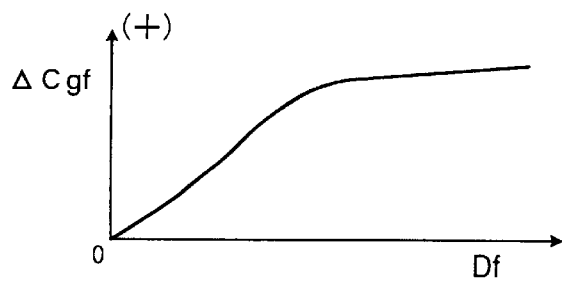
FIGS. 13A and 13B are maps for obtaining modification amounts $\Delta$Cgf and $\Delta$Caf for Cg and Ca based upon a flapping index Df.
Figure 13B:
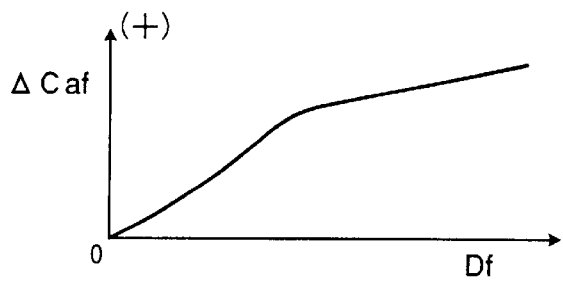

The damping coefficients Cg and Ca may further be modified against a flapping of the wheels. For this purpose, vertical velocities $\dot{X}j$ (j=ain, aout, bin and bout) of the wheels are obtained by differentiating the vertical strokes Xj (j=ain, aout, bin and bout) or integrating the vertical accelerations $\ddot{X}j$ (j=ain, aout, bin and bout) on a time basis, and then by processing the vertical stroking velocities $\dot{X}j$ by a band pass filter for passing those of the flapping frequencies of the wheels to obtain a flapping index Df. Then, modification amounts ΔCgf and ΔCaf for additively modifying Cg and Ca are obtained against the magnitude of Df according to maps such as shown in FIGS. 13A and 13B, so that the phantom side and angular shock absorbers 122 and 124 are hardened according to an increase of the flapping index Df. The general performances of ΔCgf and ΔCaf relative to Df will be apparent from the maps.

Figure 8A:
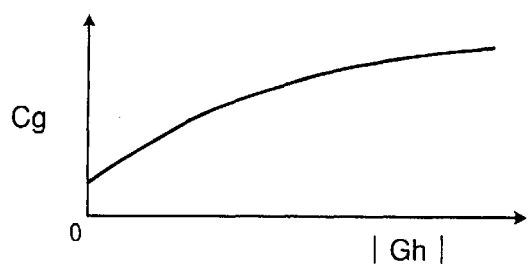
FIGS. 8A, 8B, 8C and 8D are maps for obtaining basic values of Cg, Ca, Lx and Ly based upon the absolute values of vertical acceleration Gh, longitudinal acceleration Gx, and lateral acceleration Gy of the vehicle body.
Figure 8B:
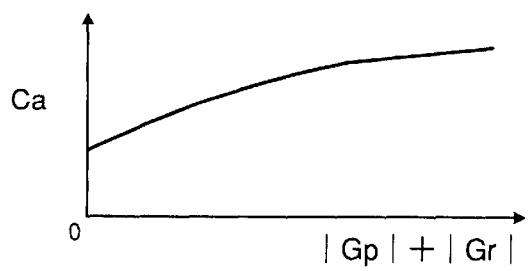
Figure 8C:
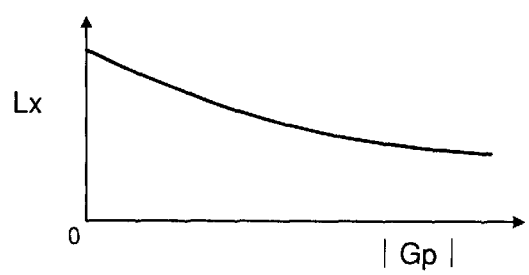
Figure 8D:
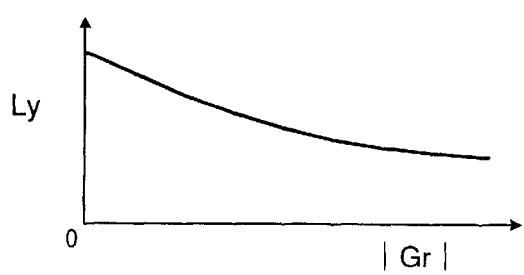

The modifications by ΔCgs and ΔCas against the swaying of the vehicle body, ΔCgr and ΔCar against the rattling of the vehicle body, and ΔCgf and ΔCaf against the flapping of the wheels may be made, as a matter of individual principle, such that each of these modification amounts is added to each corresponding one of Cg and Ca basically obtained from the maps of FIGS. 8A and 8B. However, when the modification amounts against the swaying of the vehicle body, the rattling of the vehicle body, and the flapping of the wheels are applied at the same time, there might occur an interference thereamong, canceling the effects of the respective modification amounts. Therefore, it might be better that these modification amounts are processed in relation to one another before being respectively added to Cg and Ca, such that the larger as a whole of a set of ΔCgs and ΔCas and a set of ΔCgf and ΔCaf are selected, while the larger as a whole of a set of thus selected set and a set of ΔCgr and ΔCar in the absolute values thereof are selected for an execution of the modification. The comparison of such two sets of modification amounts as a whole may be made, for example, by comparing the absolute value of the largest one of each set so that the set including the winner is selected. The first selection is to put a priority on either the modification against the swaying of the vehicle body or the flapping of the wheels, without sacrificing much of the other, because the performances of the two modification amounts are rather similar. On the other hands, the second selection is to put a priority on one of the modification against either the swaying of the vehicle body or the flapping of the wheels and the modification against the rattling of the vehicle body, substantially sacrificing the other, because the performances of the two modification amounts are rather opposite.

Figure 14A:
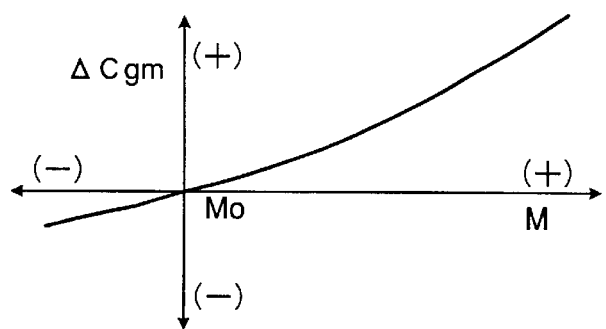
FIGS. 14A and 14B are maps for obtaining modification amounts $\Delta$Cgm and $\Delta$Cam for Cg and Ca based upon mass M of the vehicle body.
Figure 14B:
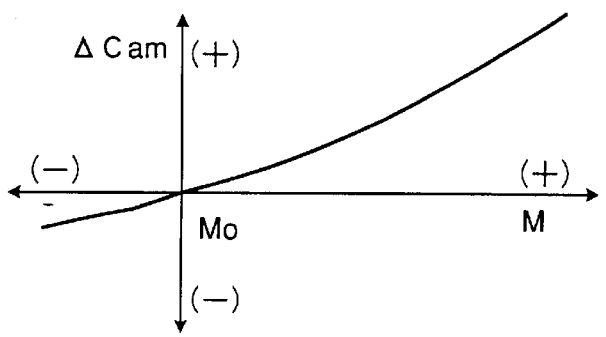

The damping coefficients Cg and Ca may further be modified according to a change of the load on the vehicle. For such a purpose, maps such as shown in FIG. 14A and 14B may be prepared. According to the maps of FIGS. 14A and 14B, modification amounts ΔCgm and ΔCgm for additively modifying Cg and Ca are varied against a total mass M including the vehicle body and the load on the vehicle, so as to be substantially proportionally increased relative to increases of the total mass M from a standard mass Mo determined for a standard load. The magnitude of M will be available from Xj (j=ain, aout, bin and bout). The general performances of ΔCgm and ΔCam relative to M will be apparent from the maps.

Figure 15A:
FIGS. 15A and 15B are maps for obtaining modification factors $\Delta$Kgh and $\Delta$Kah for Cg and Ca based upon vertical stroking velocity Uh.
Figure 15B:
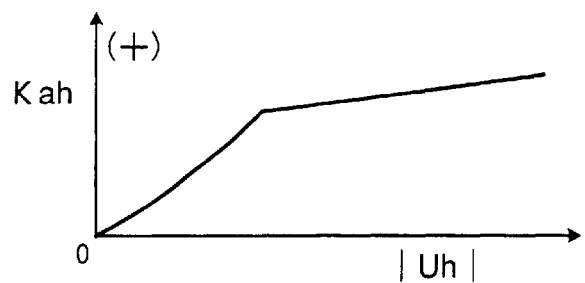

The damping coefficients Cg and Ca may further be modified according to a change of vertical stroking velocity of the vehicle body. For this purpose, vertically stroking velocities $\dot{X}j$ (j=ain, aout, bin and bout) of the wheels are obtained by differentiating the vertical strokes Xj (j=ain, aout, bin and bout) or integrating the vertical accelerations $\ddot{X}j$ (j=ain, aout, bin and bout) on a time basis, such that vertical stroking velocity Uh of the vehicle body is obtained as a mean value of $\dot{X}ain$, $\dot{X}aout$, $\dot{X}bin$ and $\dot{X}bout$. Then, by referring to maps such as shown in FIGS. 15A and 15B, modification factors Kgh and Kah are obtained as factors to be multiplied to Cg and Ca, respectively, for reflecting a variation of the damping performances of the phantom side and angular shock absorbers 122 and 124 according to the velocity of damping movement, as shown by the curves of FIGS. 15A and 15B, respectively. The general performances of Kgh and Kah relative to Uh will be apparent from the maps.

The distance L may be modified against a side slipping condition of the vehicle reflecting thereon a tendency for oversteering or understeering. For this purpose, a standard (or theoretical) yaw rate γt is calculated based upon the steering angle θ detected by the steering angle sensor 34 and vehicle speed V detected by the vehicle speed sensor 32 as follows:

$$\gamma t = V\theta/(1+\alpha V^2)H$$

$$\gamma t \leftarrow \gamma t/(1+Ts)$$

wherein, H is a wheel base of the vehicle, a is an appropriate stability factor, and T and s are a time constant and the composite variable in the Laplace transformation, respectively. The steering angle θ and the yaw rate γt or γ are made positive when the vehicle is making a left turn, while they are made negative when the vehicle is making a right turn.

Then, a deviation Δγ of an actual yaw rate γ detected by the yaw rate sensor 36 against the standard yaw rate γt is calculated as Δγ=γ-γt. In a left turn, a positive Δγ larger in the absolute value thereof indicates a higher oversteering condition, while a negative Δγ larger in the absolute value thereof indicates a higher understeering condition. In a right turn, a negative Δγ larger in the absolute value thereof indicates a higher oversteering condition, while a positive Δγ larger in the absolute value thereof indicates a higher understeering condition.

Figure 16:
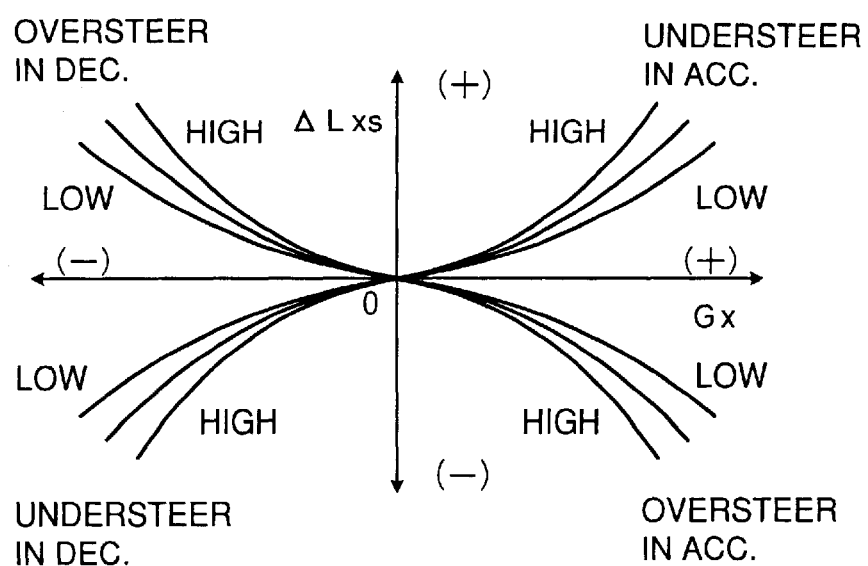
FIG. 16 is a map for obtaining modification amounts ΔLxs for Lx based upon longitudinal acceleration Gx and slipping conditions of the vehicle.

Then, by looking at a map such as shown in FIG. 16 according to the magnitude of the longitudinal acceleration Gx and the oversteering or understeering condition, a modification amount ΔLxs against the slipping condition of the vehicle is obtained. The general performance of ΔLxs relative to the oversteering or understeering condition and the direction and magnitude of the longitudinal acceleration will be apparent from the map. Modification amounts ΔLs and Δδs for L and δ are calculated based upon ΔLxs.

As will be appreciated from FIG. 16, when the vehicle is accelerated in an understeer condition, the distance Lx is increased by ΔLxs as the acceleration and/or the understeer condition increases, to decrease the rearward pitching of the vehicle body around the upper end of the phantom side shock absorber shifted in the front side of the vehicle, so as to suppress an adverse effect that the vertical load on the front wheels is decreased by such a rearward pitching. When the vehicle is accelerated in an oversteer condition, the distance L is decreased by |ΔLxs| as the acceleration and/or the oversteer condition increases, to increase the rearward pitching of the vehicle body around the upper end of the phantom side shock absorber shifted in the front side of the vehicle, so as to increase an advantage effect that the vertical load on the rear wheels is increased by such a rearward pitching. When the vehicle is decelerated in an oversteer condition, the distance L is increased by ΔLxs as the deceleration and/or the oversteer condition increases, to decrease the forward pitching of the vehicle body around the upper end of the phantom side shock absorber shifted in the rear side of the vehicle, so as to suppress an adverse effect that the vertical load on the rear wheels is decreased by such a forward pitching. When the vehicle is decelerated in an understeer condition, the distance L is decreased by |ΔLxs| as the deceleration and/or the understeer condition increases, to increase the forward pitching of the vehicle body around the upper end of the phantom side shock absorber shifted in the rear side of the vehicle, so as to increase an advantage effect that the vertical load on the front wheels is increased by such a forward pitching.

Although the present invention has been described in detail with respect to some preferred embodiments thereof, it will be apparent for those skilled in the art that various modifications are possible with respect to the shown embodiments within the scope of the present invention.

What is claimed is:

1. A device for controlling damping coefficients of shock absorbers of a four-wheeled vehicle having a vehicle body, front left, front right, rear left and rear right wheels each supporting the vehicle body at a corresponding portion thereof, and the shock absorbers each acting between each of the wheels and the corresponding portion of the vehicle body, comprising:

means for constructing a phantom damping system composed of a phantom side shock absorber disposed vertically at a skewed position laterally inside of a turn running of the vehicle and longitudinally shifted from a center of gravity of the vehicle body in a direction of an acceleration or a deceleration of the vehicle to have a lower end movable along a ground surface together with the vehicle and an upper end vertically movable relative to the lower end with a first phantom damping coefficient therebetween, and a phantom angular shock absorber arranged to act between the upper end of the phantom side shock absorber and the vehicle body with a second phantom damping coefficient therebetween, such that the phantom damping system provides the vehicle body with a substantially same phantom vertical damping force against a vertical movement of the vehicle body, a substantially same phantom angular damping moment against a rolling angular movement of the vehicle body during a rolling of the vehicle body due to the turn running, and a substantially same phantom angular damping moment against a pitching angular movement of the vehicle body during a pitching of the vehicle body due to the acceleration or the deceleration of the vehicle, respectively, as the shock absorbers acting between the wheels and the corresponding portions of the vehicle;

means for calculating values of at least the first and second phantom damping coefficients for obtaining an optimum rolling and/or pitching performance of the vehicle body by the phantom damping system during the turn and/or acceleration or deceleration running of the vehicle; and means for controlling the damping coefficients of the shock absorbers acting between the wheels and the corresponding portions of the vehicle body based upon the calculated values of the first and second phantom damping coefficients.

2. A device according to claim 1, wherein the calculating means calculate a basic value of the first phantom damping coefficient of the phantom side shock absorber based upon a mean value of vertical accelerations of the portions of the vehicle body corresponding to the front left, front right, rear left and rear right wheels by looking at a map prepared therefor, and a basic value of the second phantom damping coefficient of the phantom angular shock absorber based upon a sum of a rotational acceleration of the vehicle body around a pitching axis thereof and a rotational acceleration of the vehicle body around a rolling axis thereof by looking at a map prepared therefor.

3. A device according to claim 2, wherein the calculation means also calculate basic values of the skewed position of the phantom side shock absorber for obtaining an optimum rolling and/or pitching performance of the vehicle body by the phantom damping system during the turn and/or acceleration or deceleration running of the vehicle.

4. A device according to claim 3, wherein the calculating means calculate a basic value of a skew distance between the center of gravity of the vehicle body and the phantom side shock absorber and a basic value of a skew angle of the position of the phantom side shock absorber according to a basic longitudinal component determined based upon a rotational acceleration of the vehicle body around a pitching axis thereof by looking up a map prepared therefor and a basic lateral component determined based upon a rotational acceleration of the vehicle body around a rolling axis thereof by looking at maps prepared therefor.

5. A device according to claim 4, wherein the calculating means further calculate a modification amount for additively modifying the basic value of the longitudinal component of the skew distance according to an understeering or an oversteering condition and a longitudinal acceleration of the vehicle, such that the modification amount is increased as the longitudinal acceleration increases in the forward direction of the vehicle with an understeering condition increasing, the modification amount is increased as the longitudinal acceleration increases in the rearward direction of the vehicle with an oversteering condition increasing, the modification amount is decreased as the longitudinal acceleration increases in the rearward direction of the vehicle with an understeering condition increasing, and the modification amount is decreased as the longitudinal acceleration increases in the forward direction of the vehicle with an oversteering condition increasing.

6. A device according to claim 2, wherein the calculating means further calculate a modification amount for additively modifying the basic value of the first phantom damping coefficient of the phantom side shock absorber according to a rate of throttle opening, such that the throttle opening rate dependent modification amount is generally increased according to an increase of the throttle opening rate.

7. A device according to claim 6, wherein the calculating means further calculate a modification amount for additively modifying the basic values of the second phantom damping coefficient of the phantom angular shock absorber according to the throttle opening rate, such that the throttle opening rate dependent modification amount is generally increased according to an increase of the throttle opening rate.

8. A device according to claim 7, wherein the calculating means further calculate a modification amount for additively modifying the basic value of the skew distance of the phantom side shock absorber according to the throttle opening rate, such that the throttle opening rate dependent modification amount is generally decreased according to an increase of the throttle opening rate.

9. A device according to claim 2, wherein the calculating means further calculate a modification amount for additively modifying the basic value of the first phantom damping coefficient of the phantom side shock absorber according to a brake stroke, such that the brake stroke dependent modification amount is generally increased according to an increase of the brake stroke.

10. A device according to claim 9, wherein the calculating means further calculate a modification amount for additively modifying the basic value of the second phantom damping coefficients of the phantom angular shock absorber according to the brake stroke, such that the brake stroke dependent modification amount is generally increased according to an increase of the brake stroke.

11. A device according to claim 10, wherein the calculating means further calculate a modification amount for additively modifying the basic value of the skew distance of the phantom side shock absorber according to the brake stroke, such that the brake stroke dependent modification amount is generally decreased according to an increase of the brake stroke.

12. A device according to claim 2, wherein the calculating means further calculate a modification amount for additively modifying the basic values of the first phantom damping coefficient of the phantom side shock absorber according to a swaying index indicating a liability of the vehicle body to sway, such that the swaying index dependent modification amount is generally increased according to an increase of the swaying index.

13. A device according to claim 12, wherein the calculating means further calculate a modification amount for additively modifying the basic value of the second phantom damping coefficient of the phantom angular shock absorber according to the swaying index, such that the swaying index dependent modification amount is generally increased according to an increase of the swaying index.

14. A device according to claim 2, wherein the calculating means further calculate a modification amount for subtractively modifying the basic value of the first phantom damping coefficient of the phantom side shock absorber according to a rattling index indicating a liability of the vehicle body to rattle, such that the rattling index dependent modification amount is generally increased in the absolute value thereof according to an increase of the rattling index.

15. A device according to claim 14, wherein the calculating means further calculate a modification amount for subtractively modifying the basic value of the second phantom damping coefficient of the phantom angular shock absorber according to the rattling index, such that the rattling index dependent modification amount is generally increased in the absolute value thereof according to an increase of the rattling index.

16. A device according to claim 2, wherein the calculating means further calculate a modification amount for additively modifying the basic value of the first phantom damping coefficient of the phantom side shock absorber according to a flapping index indicating liability of the wheels to flap, such that the flapping index dependent modification amount is generally increased according to an increase of the flapping index.

17. A device according to claim 16, wherein the calculating means further calculate a modification amount for additively modifying the basic value of the second phantom damping coefficient of the phantom angular shock absorber according to the flapping index, such that the flapping index dependent modification amount is generally increased according to an increase of the flapping index.

18. A device according to claim 2, wherein the calculating means further calculate a modification amount for additively modifying the basic value of the first phantom damping coefficient of the phantom side shock absorber according to a flapping index indicating liability of the wheels to flap, such that the flapping index dependent modification amount is generally increased according to an increase of the flapping index, and a modification amount for additively modifying the basic value of the second phantom damping coefficient of the phantom angular shock absorber according to the flapping index, such that the flapping index dependent modification amount are generally increased according to an increase of the flapping index, and then further select either the swaying index dependent modification amount or the flapping index dependent modification amounts which are larger than the other as a whole for additively modifying the basic values of the first and second phantom damping coefficients.

19. A device according to claim 18, wherein the calculating means further calculate a modification amount for subtractively modifying the basic value of the first phantom damping coefficient of the phantom side shock absorbers according to a rattling index indicating liability of the vehicle body to rattle, such that the rattling index dependent modification amount is generally increased in the absolute value thereof according to an increase of the rattling index, and a modification amount for subtractively modifying the basic value of the second phantom damping coefficient of the phantom angular shock absorber according to the rattling index, such that the rattling index dependent modification amount is generally increased in the absolute value thereof according to an increase of the rattling index, and then further select either the selected swaying index dependent or flapping index dependent modification amounts or the rattling index dependent modification amounts which are larger than the other as a whole in the absolute values thereof for additively or subtractively modifying the basic values of the first and second phantom damping coefficients.

20. A device according to claim 2, wherein the calculating means further calculate a modification amount for additively modifying the basic value of the first phantom damping coefficient of the phantom side shock absorber according to a mass of the vehicle body, such that the mass dependent modification amount is generally increased according to an increase of the mass.

21. A device according to claim 20, wherein the calculating means further calculate a modification amount for additively modifying the basic value of the second phantom damping coefficient of the phantom angular shock absorber according to the mass, such that the mass dependent modification amount is generally increased according to an increase of the mass.

22. A device according to claim 2, wherein the calculating means further calculate a modification factor for proportionally modifying the basic value of the first phantom damping coefficient of the phantom side shock absorber according to a vertically stroking velocity of the vehicle body, such that the vertically stroking velocity dependent modification factor is generally increased according to an increase of the vertically stroking velocity.

23. A device according to claim 22, wherein the calculating means further calculate a modification factor for proportionally modifying the basic value of the second phantom damping coefficient of the phantom angular shock absorber according to the vertically stroking velocity, such that the vertically stroking velocity dependent modification factor is generally increased according to an increase of the vertically stroking velocity.

* * * * *